Dec. 10, 1929.  H. H. BOYCE  1,739,284
HOUSING FOR MOTOR HEAT INDICATORS
Filed May 25, 1927
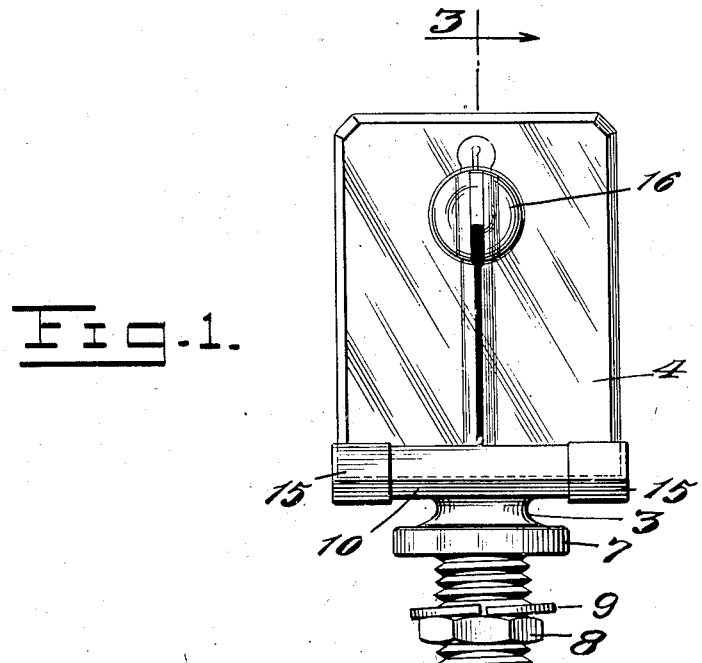
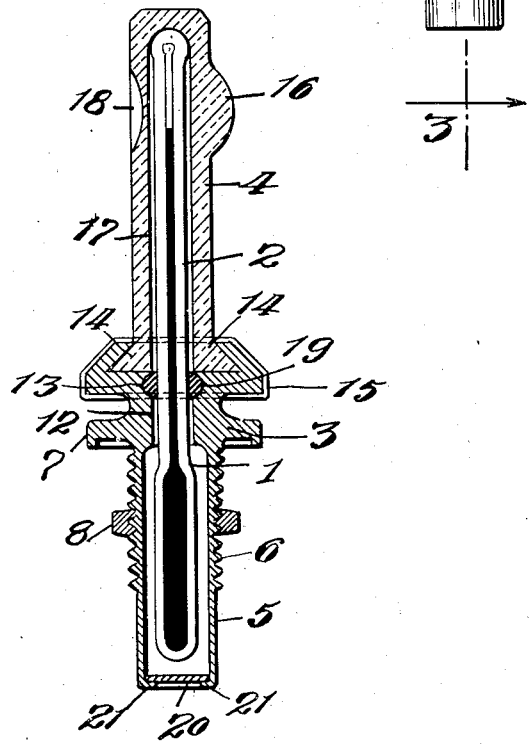
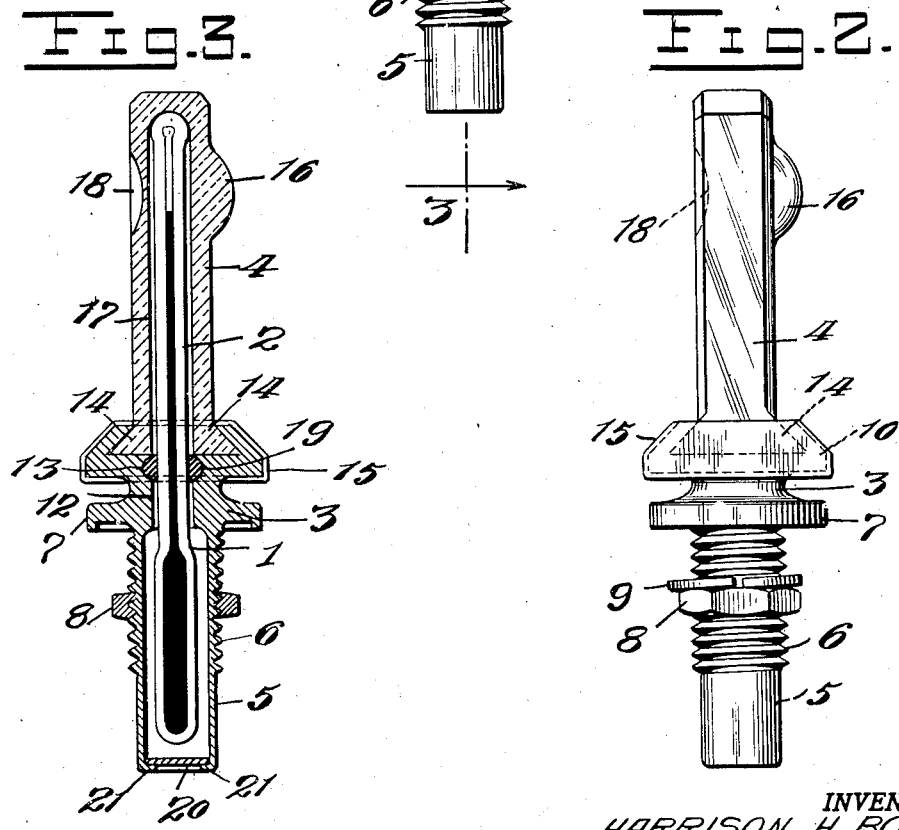
INVENTOR
HARRISON H. BOYCE
BY
ATTORNEY Patented Dec. 10, 1929

1,739,284

UNITED STATES PATENT OFFICE

HARRISON H. BOYCE, OF JERICHO, NEW YORK

HOUSING FOR MOTOR-HEAT INDICATORS

Application filed May 25, 1927. Serial No. 194,008.

This invention relates in general to devices for indicating the conditions within the cooling systems of automotive internal combustion engines and particularly to a device for indicating the heat condition within the space above the cooling liquid in an automotive radiator.

One of the objects of this invention is to provide a device for indicating the heat condition within an automotive radiator which is rugged in construction, cheap of manufacture, and attractive in appearance.

Another object of this invention is to provide a transparent housing of glass or the like of a simplified plate form for the indicating element of a device for indicating the heat condition within an automotive radiator, which combines ornamental beauty and simplicity as well as greater visibility of the indicating element either day or night.

Another object of this invention is to provide in a device for indicating the heat condition within an automotive radiator, a new and improved method of attaching a transparent casing for an indicating element to a metallic base.

Other objects and advantages of this invention will become apparent from the specification, claims, and appended drawings, in which:—

Figure 1 is a front elevation view of my device.

Figure 2 is a side elevational view thereof, and

Figure 3 is a cross-sectional view on the line 3—3 of Fig. 1.

My device consists essentially of three principal parts, a heat responsive element 1 having an indicating stem 2, a base member 3, and a transparent housing 4 of plate form. The base member 3 is formed with a downwardly projecting hollow stem 5 threaded externally at 6. At the top of the stem 5 is a shoulder 7 cupped slightly on its under surface as shown in Fig. 3. The stem 5 of the base 3 is adapted to pass through a radiator cap or closure device, not shown in the drawings, and to be secured thereto with the shoulder 7 resting against the outer surface of the radiator cap or closure device by a nut 8 and lock washer 9.

The upper portion of the base 3 is of T head form, as shown in Fig. 1 and is designated by the numeral 10. The upper surface of the T head 10 is of channeled form and the side walls 11 of the channel sloping upwardly and inwardly, as shown in Fig. 3, thus forming the part of a dove-tail joint. An aperture 12 extends from the hollow stem 5 to the base of the channel shaped T head 10. This aperture is provided with an enlarged recess portion just below the bottom of the channel in the T head for purposes which will be hereinafter more fully described. The casing 4 is formed of a transparent material such as glass or bakelite and is of plate form and rectangular outline with chamfered edges, as shown in the drawings. The base of the casing 4 is formed with outwardly extending sloping portions 14 which are adapted when the casing is in position upon the base 3 to engage the upwardly and inwardly sloping faces 11 of the channelled T head of the base and thus secure the casing to the base by a dove-tail joint, as shown in Fig. 3.

Cap members 15 are provided for either end of the channel shaped T head 10. These cap members slip over the end of the T head and close the end of the channel therein thus preventing the casing 4 from sliding endwise out of the channel shaped T head. The caps 15 may be secured to the channel shaped T head by any suitable means such as by pins, screws, soldering, welding or in any other suitable manner.

The casing 4 is formed with an aperture 17 extending upwardly from the base to a point near the upper part of the casing. This aperture is in axial alinement with the aperture 12 in the base 3. The hollow stem 5, aperture 12, and aperture 17 together form a housing for a heat responsive device and the indicating element thereof. Near the upper end of the aperture 17 and on the side thereof facing the operator of a motor vehicle upon which my device is mounted, a magnifying projection 16 is formed. On the rear face of the casing 4 and opposite the projection 16, a concave faceted depression 18 is formed.

The purpose of this depression 18 is to diffuse and refract the light to the rear of the magnifying projection 16. The purpose of this magnifying projection will be described hereinafter. The casing 4 may be cast, pressed, moulded, or formed in any other suitable manner and if desired may have the usual indications such as, freezing, boiling, cold, steam, etc., formed therein or thereon.

A heat responsive device 1 is situated within the hollow stem 5 of the base 3 and the indicating element 2 thereof extends through the aperture 12 in the base and the aperture 17 in the casing 4 to a point near the top thereof. The heat responsive device is held in place by a ring 19 of rubber, cork, or other suitable material filling the recess 13 in the base member 3 and tightly gripping the stem 2 of the heat responsive device. The portion of the indicating range of the indicating stem 2 which corresponds to dangerous conditions within the cooling system of an automotive engine to the cooling system of which my device is attached lies to the rear of the magnifying projection 16. It will thus be seen that the indications of the heat indicating device are accentuated throughout the range corresponding to such dangerous conditions.

From the foregoing description it is apparent that my device may be readily assembled by first inserting the ring 19 of rubber, cork, or other suitable material in the recess 13 in the base 3. The casing 4 is now secured to the base 3 by sliding the casing into the channel in the T head with the portions 14 of the casing 4 engaging the inwardly sloping sides 11 of the channel. The cap members 15 are now placed on either end of the T head and secured in place as hereinbefore set forth. If desired, one of the cap members 15 may be secured to the T head before inserting the casing 4 in the channel of the T head. The heat responsive device 1 is now inserted thru the lower end of the hollow stem 5 of the base 3. The open lower end of the hollow stem 5 is now closed by the plate 20 and the edges of the stem spun over at 21 to retain the plate in position. If desirable the plate 20 may be backed by cement or heat insulating material to facilitate holding the same in place. The housing 4, while shown as rectangular, may of course be substantially round.

Various changes in the construction of the embodiment illustrated in the drawings may be made without departing from the spirit of the invention, and I do not therefore desire to limit myself to the specific construction shown and described, but to interpret the invention broadly within the scope of the appended claims.

What I claim as my invention is:

1. In a device for indicating the heat condition within an automotive radiator, a heat responsive device having an indicating element, a base, and a transparent housing for said indicating element secured to said base by a dove-tail joint, the base and the housing entirely enclosing said indicating element.

2. In a device for indicating the heat condition within an automotive radiator, a heat responsive device having an indicating element, a base, and a transparent housing of plate form formed with an aperture for housing said indicating element and secured to said base by a dove-tail joint, the base and the housing entirely enclosing said indicating element.

3. A device for indicating the heat condition within an automotive radiator including a base formed with a channelled T head, cap members for either end of said T head, and a housing of plate form secured in said channel against longitudinal movement by said cap members.

4. In a device of the class described, a base member, a housing member secured to said base member by a dove-tail joint and members secured to said base and overlapping the ends of the dove-tail joint for preventing relative endwise movement between the housing and the base.

5. In a device for indicating the heat condition within an automotive radiator, a substantially rectangular plate housing member, and a base member formed with a channelled T head engaging one edge of the housing and co-extensive with said edge.

6. In a device for indicating the heat condition within an automotive radiator, a substantially rectangular plate housing member, a base member formed with a channelled T head engaging one edge of the housing and co-extensive with said edge, and cap members one for each end of said T head secured to said head and extending across the ends of said channel.

7. In a device for indicating the heat condition within an automotive radiator, a base formed with a channelled T head having upwardly and inwardly sloping sides, a casing secured in said channel by outwardly sloping channel sides, and cap members one for each end of the T head for preventing relative longitudinal movement between the base and the casing.

8. In a device for indicating heat conditions, a base, a heat responsive device and a transparent casing for said heat responsive device and adapted to receive said heat responsive device, said base and said casing entirely enclosing said heat responsive device, said casing being interlocked with said base and of solid glass.

9. In a device for indicating heat conditions, a base, a heat responsive device and a transparent casing for said heat responsive device and adapted to receive said heat responsive device, said base and said casing entirely enclosing said heat responsive device, said casing being interlocked with said base, and additional means to prevent relative movement between said base and said casing.

10. In a device for indicating the heat condition within an automotive radiator, a supporting base, a heat responsive device having an indicating element, a transparent substantially rectangular casing formed with an aperture to receive the heat responsive device, said base and said casing entirely enclosing said heat responsive device, and means to secure said casing to said base against any movement.

11. In a device for indicating heat conditions within an automotive radiator, a base having an aperture, a solid rectangular transparent casing having a longitudinal bore, and a heat responsive device adapted to extend through said base and into said bore, said casing being provided with a projecting portion substantially near the top of said heat responsive device.

12. In a device for indicating heat conditions within an automotive radiator, a base member, a casing member secured thereon, and a heat responsive device, extending through said base, said casing being a solid polygonal transparent block and having a longitudinal bore to receive the upwardly extending heat responsive device and means to positively secure said casing to said base.

13. In an instrument of the class described, a unitary rectangular block of transparent material, a base positively and detachably secured thereto and a heat responsive element projecting through said base into said block, said base and said block entirely enclosing said heat responsive device, said block closely embracing said heat responsive device.

14. In a device for indicating heat conditions within an automotive radiator, a base having an aperture, a transparent casing having a bore, and a heat responsive device adapted to extend through said base and into said bore, the casing being provided with a projecting portion adjacent the end of the heat responsive device in said casing.

15. In a device for indicating heat conditions within an automotive radiator, a base member, a casing member secured thereon, and a heat responsive device extending through the base into the casing, and being entirely enclosed by said base and said casing, said casing having the form of a block with a bore to receive heat responsive device therein, and means to secure said casing to said base.

In testimony whereof I have affixed my signature to this specification.

HARRISON H. BOYCE.